United States Patent
Mears (10) Patent No.: US 9,934,436 B2
(45) Date of Patent: Apr. 3, 2018

(54) SYSTEM AND METHOD FOR 3D IRIS RECOGNITION

(71) Applicant: LEIDOS INNOVATIONS TECHNOLOGY, INC., Gaithersburg, MD (US)

(72) Inventor: John C. Mears, Gaithersburg, MD (US)

(73) Assignee: LEIDOS INNOVATIONS TECHNOLOGY, INC., Gaithersburg, MD (US)

( * ) Notice: Subject to any disclaimer, the term of this patent is extended or adjusted under 35 U.S.C. 154(b) by 194 days.

(21) Appl. No.: 14/722,886

(22) Filed: May 27, 2015

(65) Prior Publication Data

US 2015/0347841 A1 Dec. 3, 2015

Related U.S. Application Data

(60) Provisional application No. 62/005,298, filed on May 30, 2014.

(51) Int. Cl.
*H04N 7/18* (2006.01)
*G06K 9/00* (2006.01)
*H04N 5/232* (2006.01)

(52) U.S. Cl.
CPC ..... *G06K 9/00604* (2013.01); *G06K 9/00892* (2013.01); *H04N 5/23219* (2013.01)

(58) Field of Classification Search
CPC .......... G06K 9/00604; G06K 9/00892; H04N 5/23219
USPC .......................................................... 348/78
See application file for complete search history.

(56) References Cited

U.S. PATENT DOCUMENTS

| | | | |
|---|---|---|---|
| 2010/0002912 A1* | 1/2010 | Solinsky | G06K 9/00248 382/117 |
| 2010/0074477 A1* | 3/2010 | Fujii | G06K 9/00604 382/117 |
| 2012/0230545 A1* | 9/2012 | Zhang | G06K 9/00221 382/103 |
| 2014/0161325 A1* | 6/2014 | Bergen | G06K 9/00617 382/117 |
| 2014/0193037 A1* | 7/2014 | Stitzinger | G09G 5/12 382/103 |
| 2014/0355841 A1* | 12/2014 | Santos-Villalobos | G06K 9/0061 382/117 |

* cited by examiner

*Primary Examiner* — Allen Wong
(74) *Attorney, Agent, or Firm* — Oblon, McClelland, Maier & Neustadt, L.L.P.

(57) ABSTRACT

Aspects of the disclosure provide an iris recognition system. The iris recognition system can include a three-dimensional (3D) sensor that is configured to capture a 3D image of an iris, an iris feature extractor that is configured to generate an iris template based on the 3D image of the iris, and a memory that is configured to store the iris template.

8 Claims, 7 Drawing Sheets

SYSTEM AND METHOD FOR 3D IRIS RECOGNITION

INCORPORATION BY REFERENCE

This present disclosure claims the benefit of U.S. Provisional Application No. 62/005,298, "3D Iris Recognition" filed on May 30, 2014, which is incorporated herein by reference in its entirety.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Irises of human eyes may be used for biometric identification. The irises are internal organs that are well protected against damage and wear from the external environment. Further, characteristics of an iris are unique for each individual and very stable over a person's life. In addition, irises can be viewed using non-invasive techniques that can be performed without contact.

SUMMARY

Aspects of the disclosure provide an iris recognition system. The iris recognition system can include a three-dimensional (3D) sensor that is configured to capture a 3D image of an iris, an iris feature extractor that is configured to generate an iris template based on the 3D image of the iris, and a memory that is configured to store the iris template.

Additionally, in an embodiment, the iris recognition system can further include an iris comparator that is configured to compare a query iris template against a stored iris template to generate an iris match score. In another embodiment, the above iris recognition system can further include an iris database that is configured to store a plurality of iris templates.

In an embodiment, the 3D sensor of the iris recognition system can be further configured to capture a 3D image of a face and an iris. In addition, in an embodiment, the iris recognition system can include an illuminator that is configured to provide illumination in a visible or infrared light spectral band for the 3D sensor to capture the 3D image of the face and the iris. In an example, the iris feature extractor can be further configured to generate an iris image quality score based on the 3D image of the iris, and the iris recognition system can further include an iris database that is configured to store a plurality of iris templates, and an iris comparator that is configured to compare a query iris template against the stored iris template to generate an iris match score. In another example, the iris recognition system can further include a face recognition subsystem that is configured to perform face recognition. The face recognition subsystem can have a face feature extractor that is configured to generate a face image quality score based on the 3D image of the face and perform a feature extraction process to generate a face template, a face database that is configured to store the face template, and a face comparator that is configured to compare a query face template against a stored face template to generate a face match score.

In an embodiment, the iris recognition system can further include a fuser that is configured to fuse the iris match score and the face match score to generate a fusion score. In an example, the fuser can be configured to use the iris image quality score and the face image quality score to fuse the iris match score and the face match score to generate a quality-based fusion score.

In an embodiment, the 3D sensor is a microlens array light field camera (LFC).

Aspects of the disclosure provide a method for three-dimensional (3D) iris recognition. The method can include capturing a 3D image of an iris with a three-dimensional (3D) sensor, generating an iris template based on the 3D image of the iris, and storing the iris template. Embodiments of the methods include capturing a 3D image of a face and an iris using the 3D sensor.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
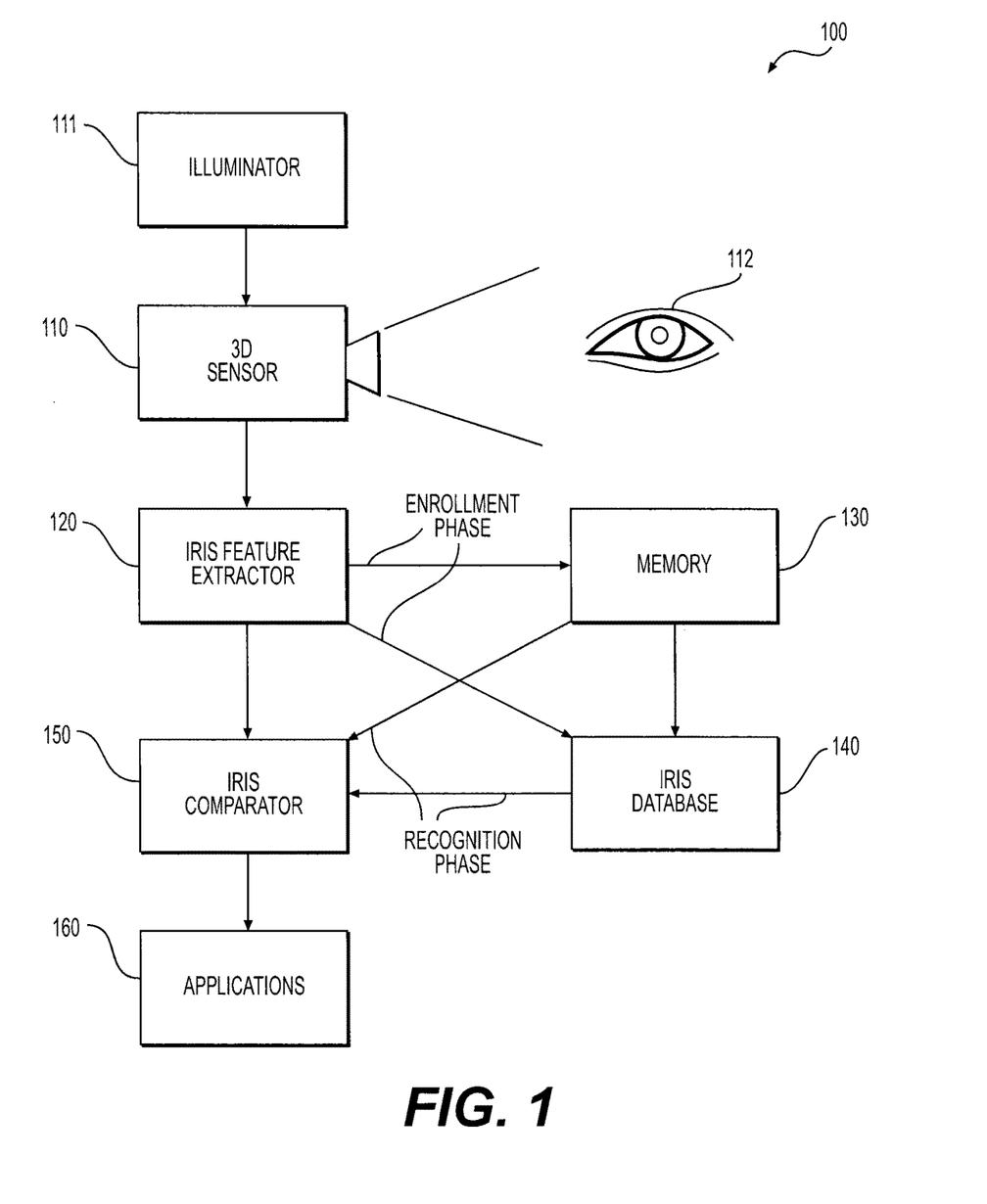
FIG. 1 shows a three-dimensional (3D) iris recognition system according to an embodiment of the disclosure.

FIG. 1 shows a three-dimensional (3D) iris recognition system 100 according to an embodiment of the disclosure. As shown, the 3D iris recognition system 100 can include a 3D sensor 110, an iris feature extractor 120, a memory 130, and an iris comparator 150. Additionally, the iris recognition system 100 can include an illuminator 111 and an iris database 140. The elements of the iris recognition system 100 may be coupled together as shown in FIG. 1.

The 3D sensor 110 is a device that is configured to capture a 3D image of an iris 112 of an individual. Data contained in the captured 3D iris image is referred to as raw 3D iris data and is transmitted to the iris feature extractor 120 for processing. For example, the 3D sensor 110 can be a camera, and depending on the requirements of various 3D camera systems 110, in order to acquire 3D iris images with a quality suitable for image processing, eyes of the individual may need to be arranged in close proximity to a 3D camera system 110. In addition, multiple instances of 3D iris images can be captured and one instance with the highest quality can be selected based on certain image quality measure for further processing.

In an embodiment, the 3D sensor 110 is a microlens array light field camera (LFC) (also referred to as plenoptic camera), such as a Lytro light field camera. According to the disclosure, the microlens array LFC can capture light field information of a scene. The light field information includes the intensity of each light ray in a scene and the direction that the light rays are traveling in space. The microlens array LFC uses a microlens array placed in front of a conventional image sensor to sense intensity, color, and directional information. Each microlens measures not just the total amount of the light deposited at the location, but how much light arrives along each ray. By re-sorting the measured arrays of light to where they would have terminated, sharp photographs focused at different depth can be computed. Subsequently, 3D images can be acquired based on the light field information captured by the microlens array LFC. In an example, depth information can be estimated from calculated focus information combined with vertical and horizontal parallax differences between the individual microlens array sensors. In an embodiment, 3D data of an image from the 3D sensor 110 is presented as a point cloud including a set of (x, y, z) coordinates of points from the surface of objects in the scene of the 3D sensor 110. In another embodiment, 3D data of a 3D image is represented as a two-dimensional range image (or depth image) where pixel intensities are proportional to the depth components, such as z coordinates of the objects.

In an embodiment, the illuminator 111 is coupled with the 3D sensor 110. The illuminator is a device that is configured to provide illumination for proper operation of the 3D sensor 110. In an example, in order to better reveal 3D structure, such as the structure of dark-colored irises, the illuminator operates in a near infrared (NIR) spectral band, such as a range of 700 nm-900 nm, instead of visible light spectra band. Operating in the NIR spectral band can also improve an image quality, as the band is not visible to humans, and thus will not cause a human subject to blink or the iris to contract. Accordingly, the microlens array LFC is configured to be sensitive to light of the NIR band. In an alternative example, in order to support multi-modal biometric operation, such as combined iris and face recognition, the illuminator can provide illumination in a visible light spectrum band, thus images of iris and face can be captured with one set of sensor and illuminator. Accordingly, the microlens array LFC is configured to be sensitive to visible light. In some examples, in order to support multi-mode biometric operation, such as combined iris and face recognition, the illuminator can provide illumination in a NIR spectral band, thus images of iris and face can also be captured with one set of sensor and illuminator.

At the iris feature extractor 120, the raw 3D iris data from the 3D sensor is subjected to pre-processing operations before a feature extraction process is performed. In an embodiment, the iris feature extractor 120 can be configured to perform three pre-processing steps. First, the quality of the acquired 3D iris image can be evaluated to determine its suitability for further processing. If the raw 3D iris data is not of sufficient quality, the 3D iris image can be recaptured. Next, an iris segmentation process can be performed to separate the iris data from the surrounding structures, such as pupil, eyelids, eyelashes and sclera. Finally, the segmented 3D iris data is subjected to a signal quality enhancement algorithm in order to improve its quality and further reduce noises.

After the pre-processing steps, in an embodiment, the iris feature extractor 120 is configured to perform the feature extraction process to generate an iris template. The iris template refers to a digital representation of the characteristics of an iris. The iris template contains salient discriminatory iris information that is essential for recognizing the individual.

Generally, usage of the 3D iris recognition system 100 includes two phases: enrollment phase and recognition phase. During the enrollment phase, the 3D iris data is acquired through the 3D sensor from the individual and iris template is generated at the iris feature extractor 120. Additionally, the template is stored in a memory or an iris database along with the person's identity, such as name, identification number, home address, and the like. During the recognition phase, the 3D iris data is reacquired from the same individual and the iris template is regenerated. The regenerated iris template is compared against the stored iris template to determine identity of the individual. As shown in the FIG. 1 example, the iris feature extractor 120 transmits the generated iris template to the memory 130 during an enrollment phase, while transmits the generated iris template to the iris comparator 150 during a recognition phase.

The memory 130 can be configured to store the iris templates generated during the enrollment phase. In an embodiment, the raw 3D iris data can be also stored in the memory 130. The memory 130 can include a volatile memory, such as a random access memory (RAM), storing the templates when the 3D iris recognition system is in operation. The memory 130 can also include a non-volatile memory, such as a flash memory, a hard disk, and the like, to store the templates and the raw 3D iris data.

In various embodiments, the 3D iris recognition system 100 can include the database 140 supporting large scale data operations. The database 140 can be configured to store the iris templates generated from the iris feature extractor 120 and the raw 3D iris data acquired at the 3D sensor 110. In an embodiment, the database 140 is configured to operate with multiple 3D iris recognition systems. Accordingly, the iris templates stored in the memory 130 can be transferred to the database 140 and be shared with multiple 3D iris recognition systems.

The iris comparator 150 can receive the iris template from the iris feature extractor 120, referred to as a query iris template, and compare the query iris template against the iris template retrieved from the memory 130 or the iris database 140, referred to as a stored iris template. The iris comparator 150 can compare the query iris template with the stored iris template to generate iris match scores during a recognition phase in an embodiment. The iris match score is a measure of the similarity between the query iris template and the stored iris template. A larger iris match score indicates greater similarity between the stored iris template and the query iris template. In an embodiment, the iris comparator 150 includes a decision making module. In an example, the iris comparator 150 operates in a verification mode. The iris comparator 150 retrieves a stored iris template from the memory 130 or the iris database 140 based on identity information claimed by the individual under recognition, and compares the query iris template against the stored iris template to generate an iris match score. Based on a pre-configured threshold, the decision module uses the iris match score to validate or invalidate the claimed identity.

In another example, the iris comparator 150 operates in an identification mode. The iris comparator 150 compares the query iris template with all templates stored in the memory 130 or the iris database 140, and generates multiple iris match scores. The decision making module, based on the multiple iris match scores, provides a ranking of the enrolled identities in order to identify the individual or facilitate further analysis, perhaps by a human examiner.

In an embodiment, the 3D iris recognition system 100 is coupled with an application module 160. In an example, the application module 160 is an entrance security control system. The iris comparator 150 of the 3D iris recognition system 100 sends result of the verification of an individual to the entrance security control system. Based on the result of the verification, the entrance security control system determines whether to provide access to the individual.

In various embodiments, the iris feature extractor 120, the iris comparator 150, and the iris database 140 can be implemented with any suitable software or hardware. In an embodiment, the 3D iris recognition system 100 is implemented as a distributed system. For example, the iris feature extractor 120 and the iris comparator 150 are implemented on a first server that is separated from the 3D sensor 110. The iris database 140 is implemented on a second server separated from the first server. The 3D sensor 110, the first server and the second server communicate with each other to operate coordinately. In an alternative embodiment, the iris feature extractor 120, the iris comparator 150 and the memory 130 of the 3D iris recognition system 100 are integrated into a stand-alone device with the 3D sensor 110 configured to be a peripheral of the stand-alone device.

Figure 2A:
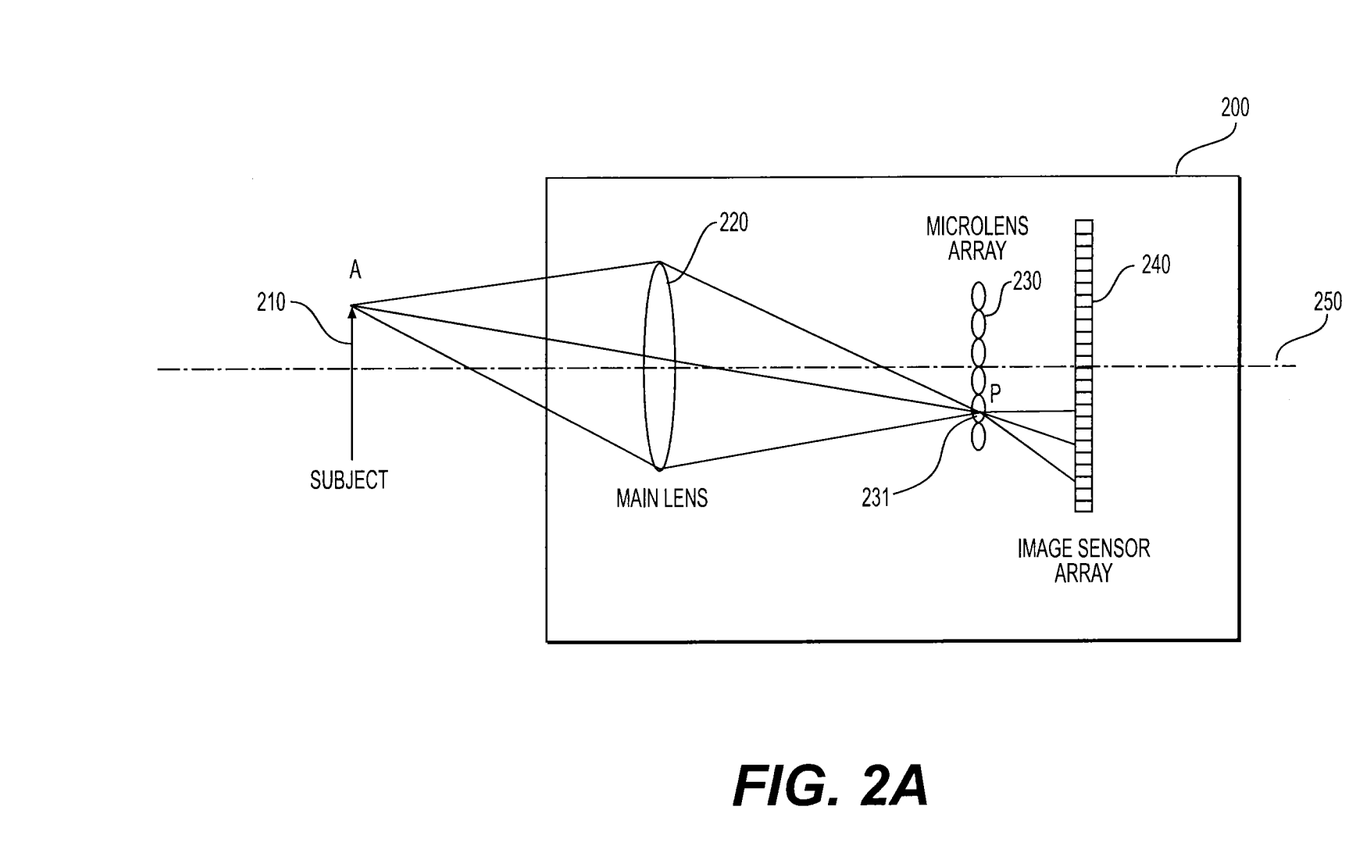
FIG. 2A shows an exemplary microlens array light field camera (LFC) according to an embodiment of the disclosure.

FIG. 2A shows an exemplary microlens array light field camera (LFC) 200 according to an embodiment of the disclosure. The microlens array LFC 200 is shown in a sectional view. Similar to a normal digital camera, the microlens array LFC 200 includes a photographic main lens 220, such as a 50 mm lens on a 35 mm format camera, and an image sensor array 240, such as a charge-coupled devices (CCD) sensor array or a complementary metal-oxide-semiconductor (CMOS) active pixel sensor array. However, different from a normal digital camera, the microlens array LFC 200 can include a microlens array 230 located between the main lens 220 and the image sensor array 240, and the microlens array 230 can be arranged at the focal plane of the main lens 220.

As shown in FIG. 2A, the main lens 220 can be translated along its optical axis 250 to focus a subject 210 of interest, such as an iris, at a desired depth. Rays of light from a single point on the subject 210, for example, point A, are focused to a single convergence point, for example, point P, on a focal plane of the main lens 220. A microlens 231 of the microlens array 230 separates the converging rays of light, based on direction of the rays of light, into an image on the image sensor array 240 behind the microlens array 230. The microlens array LFC 200 also includes a storage module (not shown), image data can be stored in the storage module after an image is captured by the image sensor array 240.

Figure 2B:
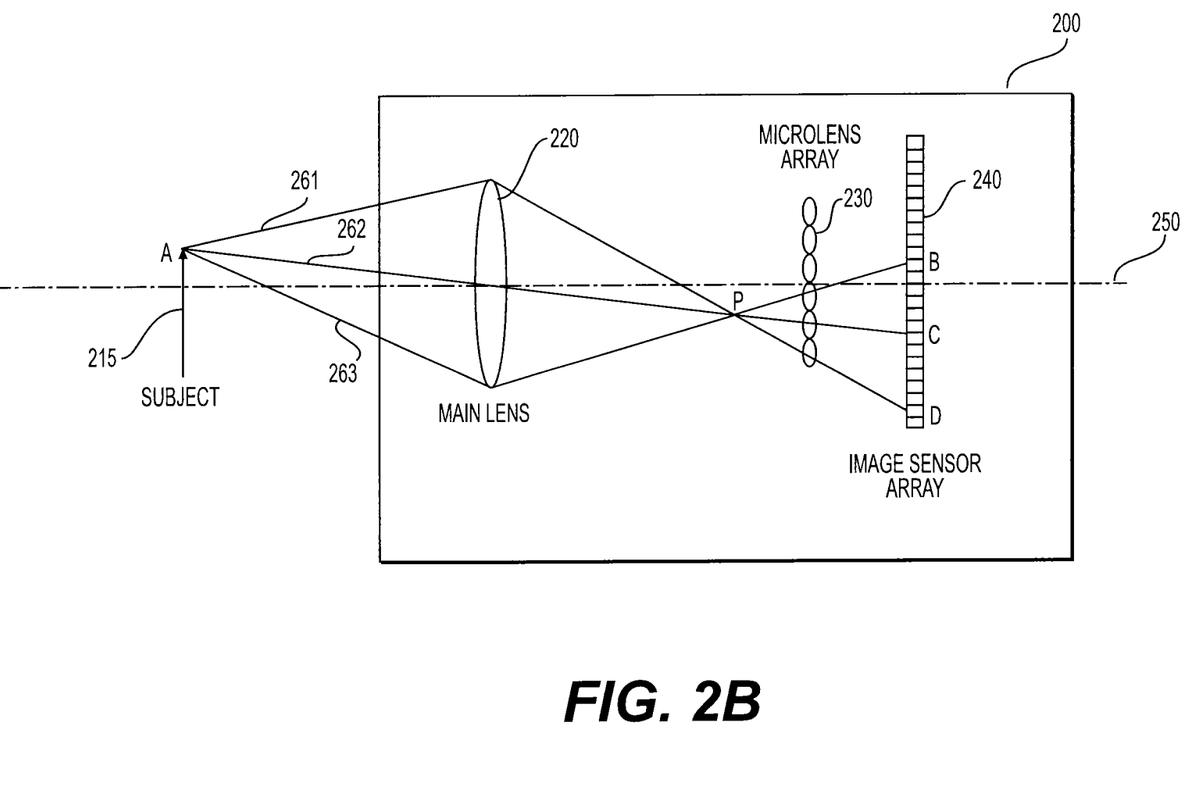
FIG. 2B shows how information of light field is captured at the microlens array LFC according to an embodiment of the disclosure.

FIG. 2B shows how information of light field is captured at the microlens array LFC 200 according to an embodiment of the disclosure. As shown, the rays 261-263 of light are emitted from a point A on a subject 215, such as an iris. The rays 261-263 pass through the main lens 220 and focus on a converging point P. Then, the rays 261-263 reach the microlens array 230 at multiple microlenses and are refracted by the multiple microlenses, respectively. Finally, the rays 261-263 reach the image sensor array 240 at three different locations D, C and B, respectively. Thus, when performing a photographic exposure, the rays 261-263 are captured at different points (sensors) in the images sensor array 240 according to the direction of each ray as well as the location of the point A. Similarly, for an object located in the field of view of the microlens array LFC 200 but positioned at different depth, information of amounts and directions of rays emitted from the object can be captured.

According to an aspect of the disclosure, a ray-tracing technique can be used to compute synthetic photographs based on the acquired information of the light field. For example, as shown in FIG. 2B, the amounts of light of rays, such as 261-263, captured at different locations, such as locations B/C/D, are summed up to count for the amount of light of the point A on the subject 215. In a similar way, amounts of light emitted from each point on the subject 215 can be computed and acquired to form a two dimensional (2D) image of the subject 215. This process is referred to as re-focusing. By refocusing operation, a synthetic 2D image of an object at different depth in the field of view of the microlens array LFC 200 can be generated.

Figure 2C:
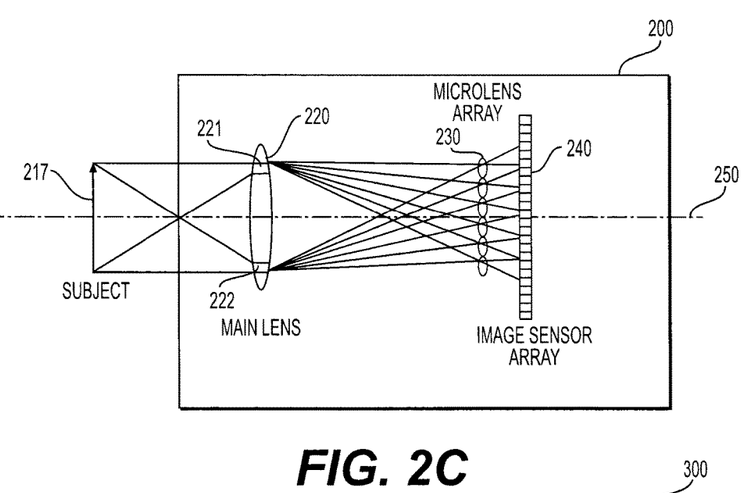
FIG. 2C shows another example where images of different perspective views can be computed using the ray-tracing technique according to an embodiment of the disclosure.

FIG. 2C shows another example where images of different perspective views can be computed using the ray-tracing technique according to an embodiment of the disclosure. As shown, the microlens array LFC 200 is used to capture information of a light field where the subject 217 exists. The main lens 220 can be thought of being segmented into multiple small apertures, such as apertures 221 and 222. As shown, rays of light passing through different apertures 221 or 222 reach the image sensor array 240 at different locations after passing through the microlens array 230. For example, a first group of rays coming from the subject 217 and passing through the aperture 221 arrive at a first group of points (sensors) at the image sensor array 240, while a second group of rays coming from the subject 217 and passing through the aperture 222 arrive at a second group of points (sensors) at the image sensor array 240. In order to acquire images with different perspective views, different apertures 221 or 222 can be chosen, and, accordingly, different groups of points (sensors) corresponding to the respective apertures can be used to compute synthetic photographs. For example, using information of the first group of rays captured at the first group of points at the image sensor array 240, a first image with a perspective view corresponding to the first aperture 221 can be generated. Similarly, a second image with a perspective view corresponding to the second aperture 222 can be generated using information of the second group of rays captured at the second group of points (sensors) at the image sensor array 240.

In an embodiment, the microlens array LFC 200 is used to capture a 3D iris image of an iris of an individual, and information of the light field around the iris is acquired and stored in the storage module in the microlens array LFC 200. Based on the information of the light field around the iris, the microlens array LFC 200 can generate a 3D iris image containing 3D iris data that includes depth information and different perspective views of the iris structure.

According to an aspect of the disclosure, the above described depth information and perspective views of the iris structure can be used to detect iris spoofing, such as colored contact lenses or painted iris pattern contact lenses. It is known that an iris is a distance away behind the cornea in an eye. Thus, a contact lens placed in front of the cornea and the iris behind the cornea have a distance between each other. Accordingly, depth information in the 3D iris image can be used to detect iris spoofing. For example, a 3D iris image of an eye wearing a painted or colored contact lens is captured. If the contact lens is transparent, two layers of image with different depth, one for the contact lens and the other for the iris, can be generated. If the contact lens is opaque, a fake iris in a flat 2D image without 3D structure can be detected. In either case, spoofing can be subsequently detected.

Figure 3:
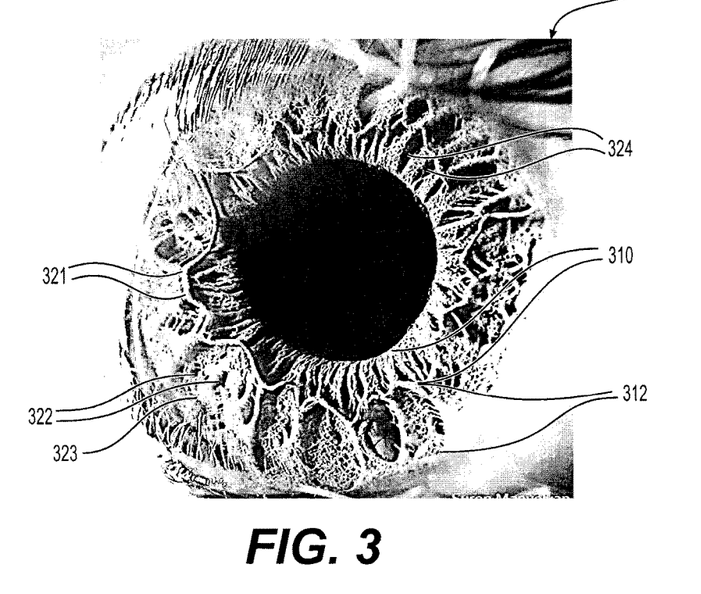
FIG. 3 shows an image of an iris illustrating rich 3D features of the iris according to an aspect of the disclosure.

FIG. 3 shows an image 300 of an iris illustrating rich 3D features of the iris according to an aspect of the disclosure. Generally, the structure of the iris has multiple layers. A posterior layer is at the back of the iris containing heavily pigmented epithelial cells. Above the posterior is a muscle layer that contracts and dilate the pupil. A stromal layer is above the muscle layer that consisted of connective tissue and blood vessels, both arranged along the radial direction. An anterior border layer is made of cells containing high density of pigment. The muscle layer, the stromal layer and the anterior border layer forms the visible portion of the iris.

As shown in FIG. 3, the visible portion of the iris can have two zones: the central pupillary zone 310 and the surrounding ciliary zone 312. Between these two zones 310 and 312 is a circular zigzag ridgeline 321. Many pit-like irregular structures referred to as crypts 322 are distributed in the ciliary zone 312. Near the outer part of the ciliary zone 312 are concentric lines 323, referred to as contraction furrows that become deeper as the pupil dilates. In addition, radial furrows 324 can be observed in the pupillary zone. Thus, the iris structure exhibits substantial 3D features that can be employed to identify individuals using a 3D iris recognition system.

Figure 4:
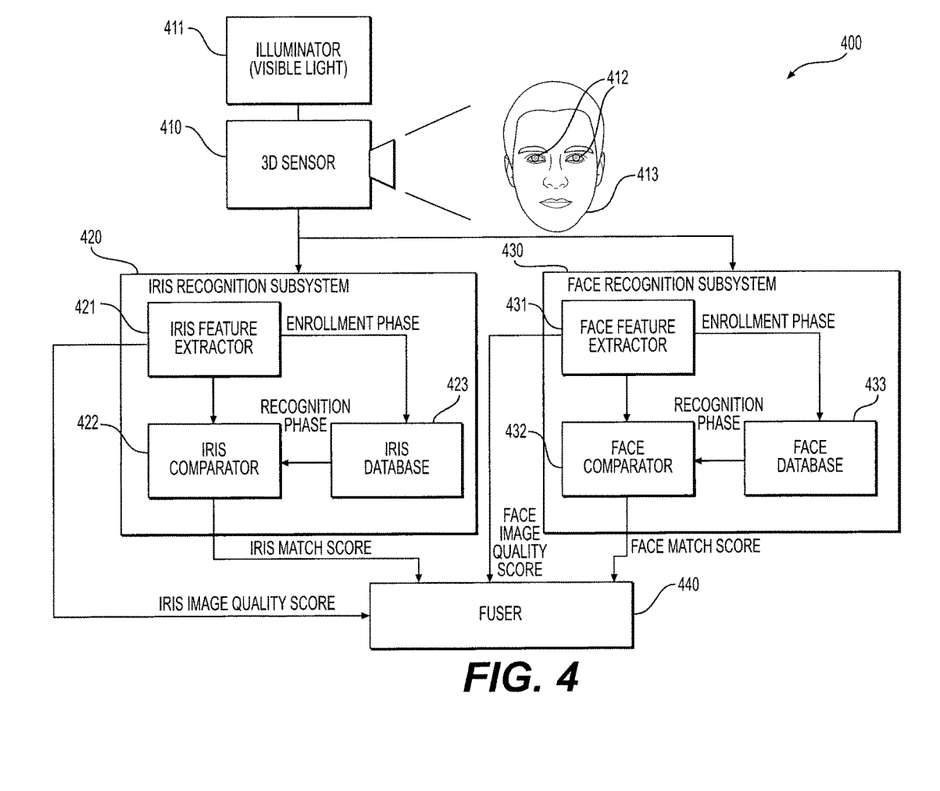
FIG. 4 shows an iris and face recognition system according to an embodiment of the disclosure.

FIG. 4 shows an iris and face recognition system 400 according to an embodiment of the disclosure. As shown, the iris and face recognition system 400 can include a 3D sensor 410, an illuminator 411, an iris recognition subsystem 420, a face recognition subsystem 430, and a fuser 440. The elements of the iris and face recognition system 400 may be coupled together as shown in FIG. 4.

According to an aspect of the disclosure, the iris and face recognition system 400 is configured to use one set of image sensor 410 and illuminator 411 to capture an image of a face 413 and two irises 412 of an individual at the same time for subsequent iris and face recognition process. Of course, it should be understood that multiple image sensors 410 and/or illuminators 411 can be used to accomplish the same functions in a coordinated manner. In an embodiment, the illuminator 411 can provide illumination in a visible light spectrum band and accordingly the sensor 410 is configured to be sensitive to visible light. In another embodiment, the illuminator 411 can provide illumination in an infrared spectrum band, and accordingly the sensor 410 is configured to be sensitive to infrared light. Conventionally, iris recognition technology uses infrared light to illuminate irises, and face recognition technology uses visible light to illuminate faces. Consequently capturing both a face and two irises in a multi-modal recognition system may require two different sets of sensors and illuminators, one set for visible light used for face recognition, and the other set for infrared used for iris recognition, respectively. Capturing an image of a face and two irises of an individual in visible light or infrared light with one set of sensors and illuminator can make the iris and face recognition system 400 more flexible and convenient.

In an embodiment, the illuminator 411 can be omitted from the iris and face recognition system 400, and ambient light can be used as the illumination for the iris and face recognition system 400.

The 3D sensor 410 is a device that is configured to capture a 3D image of the irises 412 and the face 413. The 3D image contains 3D iris and face data that includes depth information and different perspective views of the iris and face structure. In an embodiment, the 3D sensor 410 is a microlens array light field camera (LFC) as described earlier. After the 3D sensor 410 captures the 3D image of the irises 412 and the face 413, the 3D sensor 410 transmits the captured image to the iris recognition subsystem 420 and the face recognition subsystem 430, for subsequent recognition process.

The iris recognition subsystem 420 includes an iris feature extractor 421, an iris database 423 and an iris comparator 422 whose functions, structures and implementations are similar to the iris feature extractor 120, the iris database 140 and the iris comparator 150, respectively, shown in FIG. 1 described earlier. However, in an embodiment, the iris feature extractor 120 can be configured to generate an iris image quality score in addition to the preprocessing operation and the feature extraction operation. The iris image quality score can be based on certain image quality metrics and used as a measure to reflect the quality of the iris image. Because the quality of the iris image can have significant impact on the accuracy of the iris comparator 422, the iris image quality score can be taken into account during a fusion operation to improve the recognition accuracy of the iris and face recognition system 400. In an embodiment, the iris image quality score can be directly transmitted to the fuser 440 to be used for the fusion operation. In alternative embodiment, the iris image quality score can be stored in a memory (not shown) or in the iris database 423, and later retrieved by the fuser 440.

In addition, different from the iris comparator 150 in the FIG. 1 example, the iris comparator 422 is configured to transmit the generated iris match score, corresponding to the verification mode, or multiple iris match scores, corresponding to the identification mode, to the fuser 440 for the fusion operation.

The face recognition subsystem 430 includes a face feature extractor 431, a face database 433 and a face comparator 432. In an embodiment, the face feature extractor 431 is configured to perform a pre-processing of the captured 3D face image. For example, the face feature extractor 431 is configured to detect the location, size and orientation of a facial region, and subsequently segment the face area from the rest of the image. In addition, the face feature extractor 431 can be configured to filter out noise and substitute missing data with interpolation of adjacent points on the facial surface.

In an embodiment, the face feature extractor 431 is configured to extract facial features and generate one or more feature vectors using different methods. For example, the face feature extractor 431 can use a Global-feature Extraction method to extract a feature vector for the whole face region. The Global-feature Extraction method can be based on the Principle Component Analysis method. In an alternative example, the face feature extractor 431 can use a Local-feature Extraction method to extract a set of feature vectors corresponding to different facial regions. The feature vectors are used as templates that are stored into the face database 433 in the enrollment phase (the templates are referred to as stored face templates), while the feature vectors are transmitted to the face comparator 432 for comparison operation in the recognition phase (the feature vectors consists of a query face template).

In an embodiment, the face feature extractor 431 can be configured to generate a face image quality score in addition to the preprocessing operation and the feature extraction operation. The face image quality score can be based on certain image quality metrics and used as a measure to reflect the quality of the face image. Similar to iris recognition, the quality of the face image can have significant impact on the accuracy of the face comparator 432, thus, the face image quality score can be used during the fusion operation to improve the recognition accuracy of the iris and face recognition system 400. In an example, the face image quality score can be directly transmitted to the fuser 440. In alternative embodiment, the iris image quality score can be stored in a memory (not shown) or in the face database 433, and later retrieved by the fuser 440.

The face comparator 432 can receive a query face template and compare the query face template against a stored face template retrieved from the face database 433 to generate a face match score when operating in verification mode. Alternatively, when operating in identification mode, the face comparator 432 can compare the query face template against all stored face templates in the face database to generate multiple face match scores for each enrolled identity. The comparison operations of the face comparator 432 are based on certain algorithms. In addition, the face comparator 432 can be configured to transmit the generated face match score, corresponding to the verification mode, or multiple face match scores, corresponding to the identification mode, to the fuser 440 for the fusion operation.

The fuser 440 can be configured to fuse the potentially different face and iris recognition match scores to produce a fusion score, thus providing an improved accuracy for the iris and face recognition system 400 that is higher than unimodal iris or face recognition system. In addition, the fuser 440 can be configured to incorporate the information of the iris image quality score and the face image quality score during the fusion operation to further improve the accuracy. For example, in an embodiment, the fuser 440 can use a Bayesian fusion technique to calculate the fusion scores based on the iris match scores, the iris image quality score, the face match scores and the face image quality score. Particularly, in order to perform the fusion operation, individual conditional densities joining match scores and quality scores can be estimated for each of the iris recognition subsystem 420 and face recognition subsystem 430. Based on the above conditional densities, the following calculation can be conducted. When the iris and face recognition system 400 operates in verification mode, first, a quality-based likelihood ratio for each of the iris recognition subsystem and face recognition subsystem can be calculated using the match score and quality score generated from each of the iris recognition subsystem 420 and face recognition subsystem 430. Then, the quality-based likelihood ratios for each of the iris recognition subsystem 420 and face recognition subsystem 430 can be multiplied to generate a product fusion score. Based on a pre-configured threshold, the product fusion score can be used to validate or invalidated the claimed identity. Similarly, when the iris and face recognition system 400 operates in identification mode, the enquiry or probe iris or face templates are compared with stored iris or face templates of all enrolled identities, the gallery, to generate multiple iris or face match scores. Accordingly, a fusion score can be calculated for each pair of iris match score and face match score corresponding to candidate enrolled identities. Based on these fusion scores, a ranking of the candidate enrolled identities can be generated for identifying the probe individual.

In an embodiment, the iris and face recognition system 400 can be implemented as a distributed system. For example, the iris feature extractor 421, the iris comparator 422, the face feature extractor 431, the face comparator 432 and the fuser 440 can be implemented as software running on a server, and the iris database 423 and the face database 433 can be implemented on another server. The 3D sensor 410 that is separate from the other elements of the iris and face recognition system 400 can communicate with the other elements remotely. In addition, the database can be configured to operate with multiple 3D iris and face recognition systems. In alternative embodiments, the elements of the iris and face recognition system 400 can be integrated into a stand-alone device.

Figure 5A:
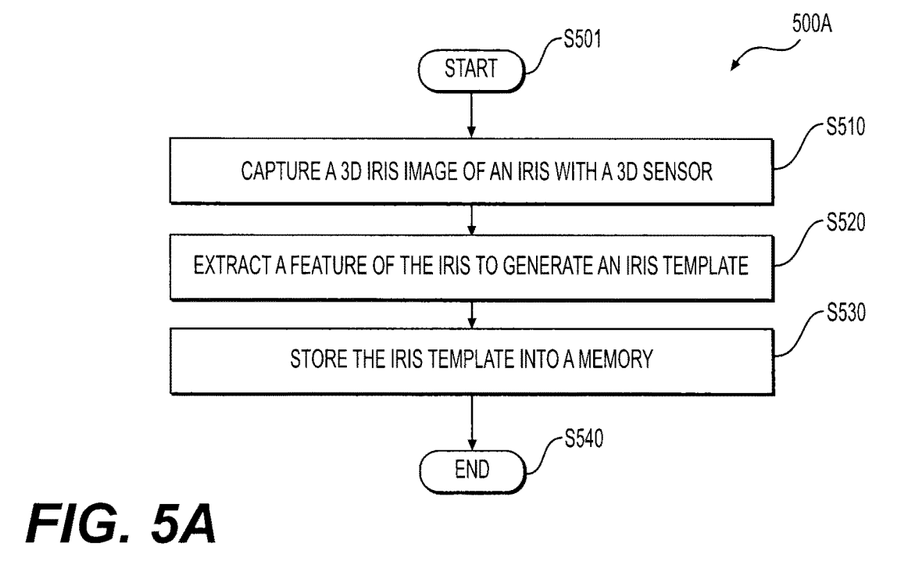
FIG. 5A shows a flow chart of a process of a 3D iris recognition system in an enrollment phase according to an embodiment of the disclosure.

FIG. 5A shows a flow chart of a process 500A of a 3D iris recognition system in an enrollment phase according to an embodiment of the disclosure. The process 500A starts at S501 and proceeds to S510.

At S510, the 3D iris recognition system captures a 3D image of an iris of an individual using a 3D sensor, such as a microlens array light field camera. The individual is a new user of the 3D iris recognition system and does not has an iris template of him stored in the 3D iris recognition system.

At S520, an iris feature extractor extracts a feature of the iris to generate an iris template based on the 3D image. The iris feature extractor transmits the iris template to a memory.

At S530, the iris template is stored in the memory. In addition, identity of the individual, such as name, identification number, address, and the like, is stored in the memory and linked with the template. In some embodiments, the memory is implemented as a database configured to store and manage templates for numerous individuals. The process proceeds to S540 and terminates.

Figure 5B:
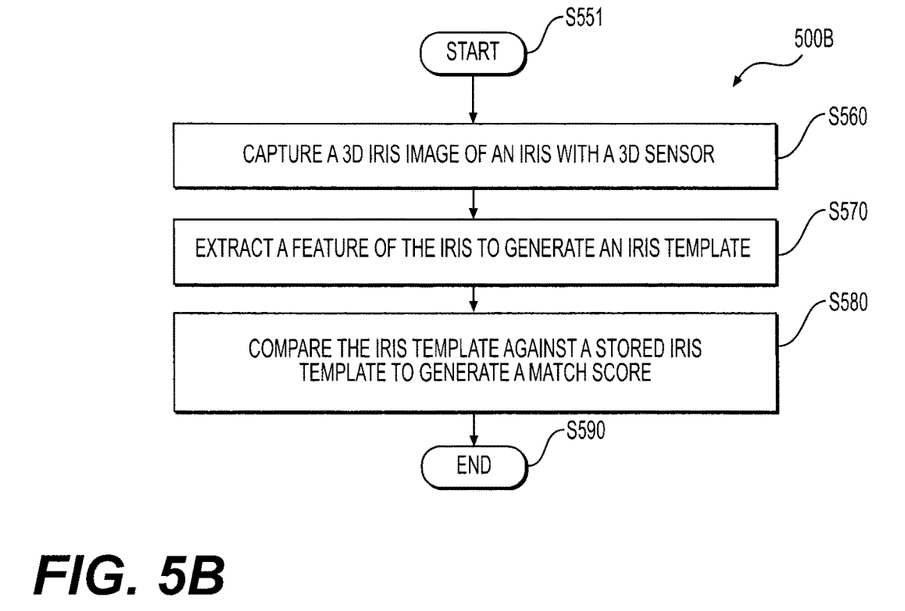
FIG. 5B shows a flow chart of a process of a 3D iris recognition system in a recognition phase according to an embodiment of the disclosure.

FIG. 5B shows a flow chart of a process 500B of a 3D iris recognition system in a recognition phase according to an embodiment of the disclosure. The process 500B starts at S551 and proceeds to S560.

At S560, the 3D iris recognition system captures a 3D image of an iris of an individual using a 3D sensor, such as a microlens array light field camera. The individual can provide his identity information to the 3D iris recognition system for verification purpose. Alternatively, the individual does not provide the identity information and the 3D iris recognition system operates in an identification mode.

At S570, an iris feature extractor extracts a feature of the iris to generate an query iris template based on the 3D image. The iris feature extractor transmits the iris template to an iris comparator in the 3D iris recognition system.

At S580, the iris comparator compares the query iris template against a stored iris template corresponding to the identity provided by the individual in case of verification mode, and generates an iris match score. The iris match score then is used to determine a verification result based on a threshold configured in the 3D iris recognition system. Alternatively, in case of identification mode, the iris comparator compares the query iris template against all stored template in a database and generates multiple iris match scores for subsequent determination of the identification. The process proceeds to S590 and terminates.

Figure 6:
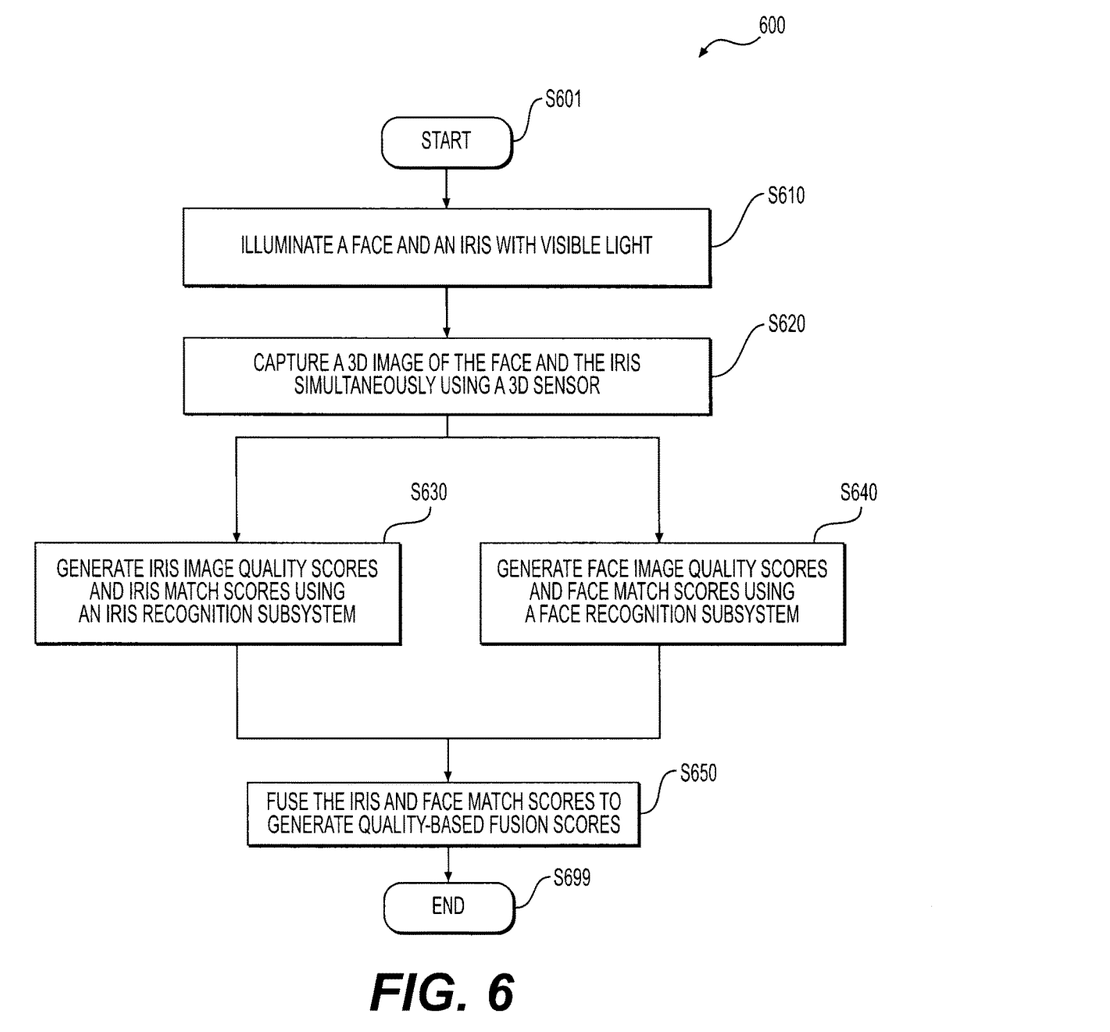
FIG. 6 shows a flowchart of a process of a 3D iris and face recognition system according to an embodiment of the disclosure.

FIG. 6 shows a flowchart of a process 600 of a 3D iris and face recognition system according to an embodiment of the disclosure. The process starts at S601 and proceeds to S610.

At S610, an illuminator of the 3D iris and face recognition system is configured to illuminate a face and an iris with light in a visible light spectrum band.

At S620, a 3D sensor, such as a microlens array light field camera, is used to capture a 3D image of the face and the iris at the same time. Subsequently, the 3D image of the face and the iris is transmitted to an iris recognition subsystem and a face recognition subsystem of the 3D iris and face recognition system.

At S630, an iris recognition subsystem receives the 3D image and generates an iris image quality score, an iris match score when operating in the verification mode, or multiple iris match scores when operating in the identification mode. The process proceeds to S650.

At S640, parallel to S630, a face recognition subsystem receives the 3D image and generates a face image quality score, an face match score when operating in the verification mode, or multiple face match scores when operating in the identification mode. The process proceeds to S650.

At S650, a fuser of the iris and face recognition system fuses the iris and face match scores to generate quality based fusion scores using the iris image quality score and the face image quality score. In an embodiment, the fuser uses the Bayesian fusion technique. For verification mode, a fusion score is generated and compared against a threshold to validate identification. For identification mode, a ranking of enrolled identities based on the fusion scores is generated for identify an individual.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An iris and face recognition system, comprising:
   a three-dimensional (3D) sensor that is configured to capture a 3D image of an iris and a face including depth information and different perspective views of the iris and the face;
   an iris feature extractor that is configured to generate an iris image quality score and an iris template based on the 3D image of the iris and the face;
   an iris comparator that is configured to compare the iris template against an iris template stored in an iris database to generate an iris match score;
   a face feature extractor that is configured to generate a face image quality score and a face template based on the 3D image of the iris and the face;
   a face comparator that is configured to compare the face template against a face template stored in a face database to generate a face match score; and
   a fuser that is configured to fuse the iris match score and the face match score to generate a fusion score.

2. The iris and face recognition system of claim 1, further comprising:
   an illuminator that is configured to provide illumination in a visible or infrared light spectral band for the 3D sensor to capture the 3D image of the face and the iris.

3. The iris and face recognition system of claim 1, wherein the fuser is configured to use the iris image quality score and the face image quality score to fuse the iris match score and the face match score to generate a quality-based fusion score.

4. The iris and face recognition system of claim 1, wherein the 3D sensor is a microlens array light field camera (LFC).

5. A method for three-dimensional (3D) iris and face recognition, comprising:
   capturing a 3D image of an iris and a face with a three-dimensional (3D) sensor, the 3D image including depth information and different perspective views of the iris and the face;
   generating an iris image quality score and an iris template based on the 3D image of the iris and the face;
   comparing the iris template against an iris template stored in an iris database to generate an iris match score;
   generating a face image quality score and a face template based on the 3D image of the iris and the face;
   comparing the face template against a face template stored in a face database to generate a face match score; and
   fusing by a fuser the iris match score and the face match score to generate a fusion score.

6. The method of claim 5, further comprising:
   providing illumination in a visible light spectral band for the 3D sensor to capture the 3D image of the face and the iris.

7. The method of claim 5, wherein fusing the iris match score and the face match score includes:
   using the iris image quality score and the face image quality score to fuse the iris match score and the face match score to generate a quality-based fusion score.

8. The method of claim 5, wherein the 3D sensor is a microlens array light field camera (LFC).

* * * * *